Nov. 4, 1952 J. G. LINDEMAN ET AL 2,616,349
INTEGRAL TOOL CARRIER
Filed Sept. 17, 1948 6 Sheets-Sheet 1
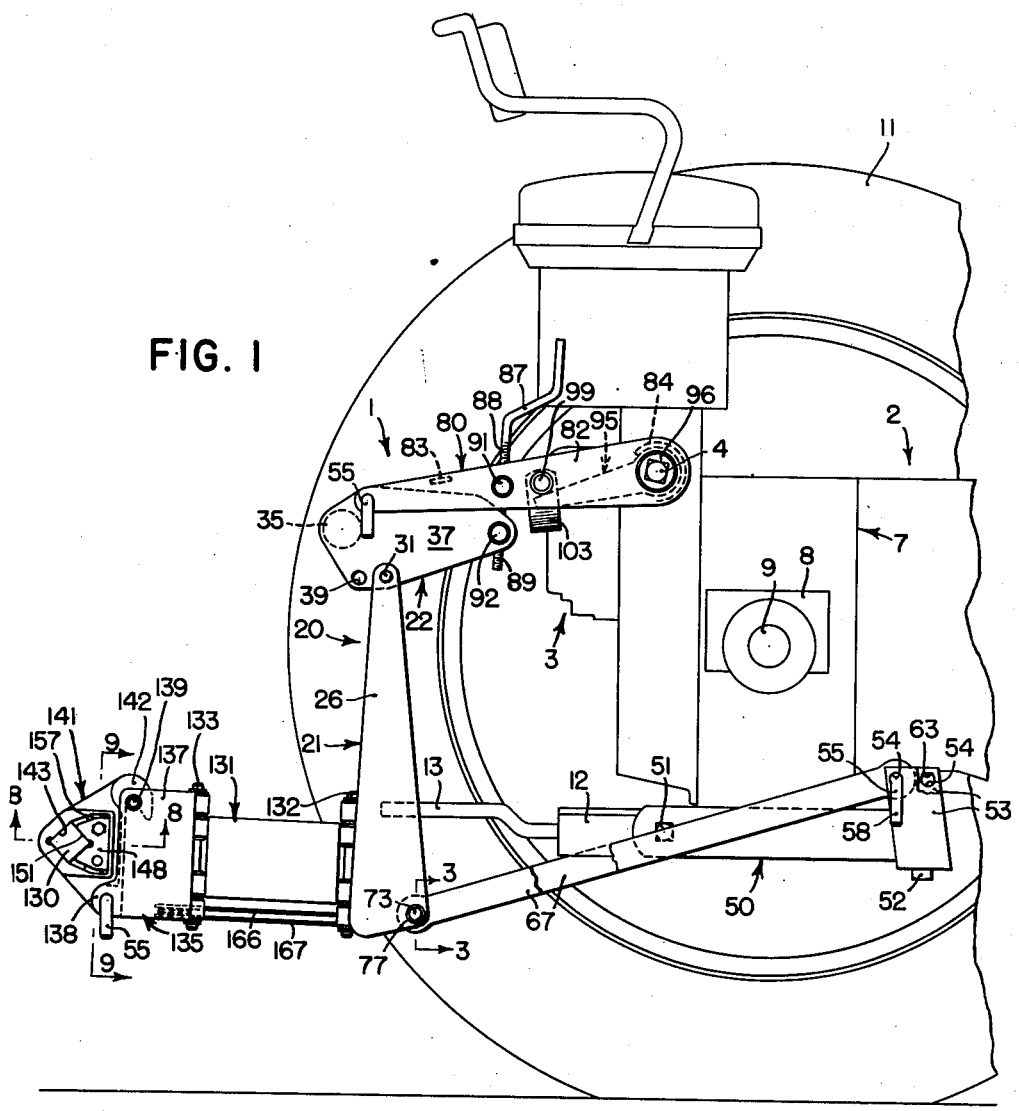
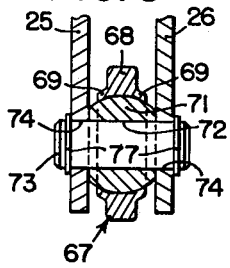
INVENTORS.
JESSE G. LINDEMAN, LAWRENCE F. HEINL,
ROBERT D. KREHBIEL, ORIE L. DURLAND
BY
ATTORNEYS

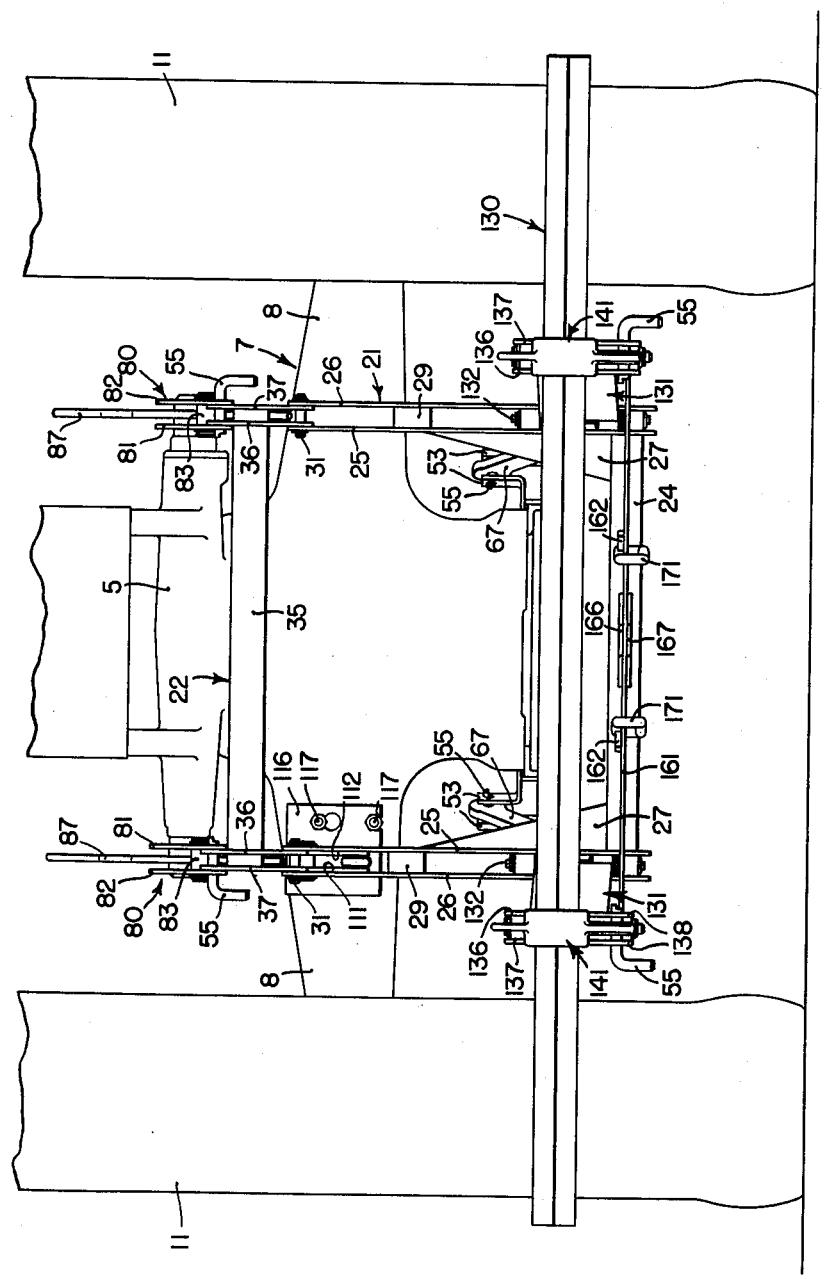

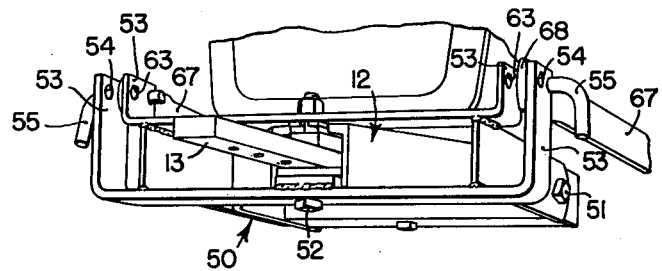
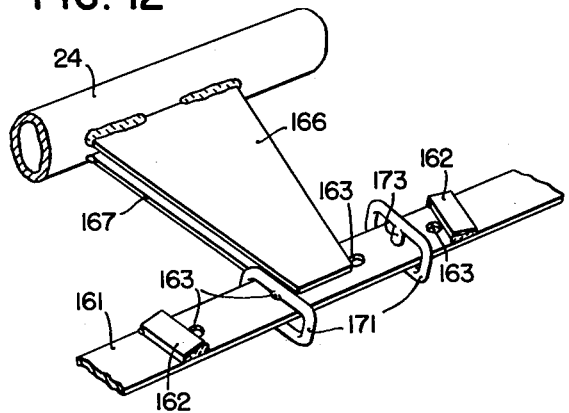
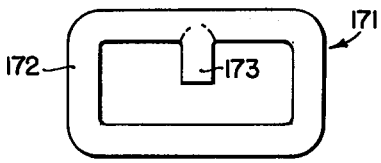
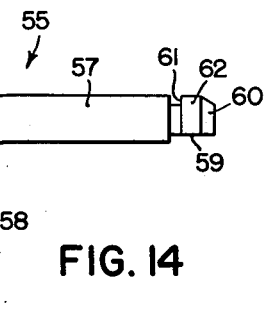
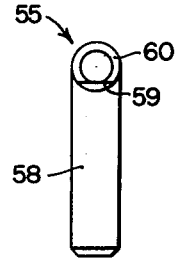

Nov. 4, 1952 J. G. LINDEMAN ET AL 2,616,349
INTEGRAL TOOL CARRIER
Filed Sept. 17, 1948 6 Sheets-Sheet 4
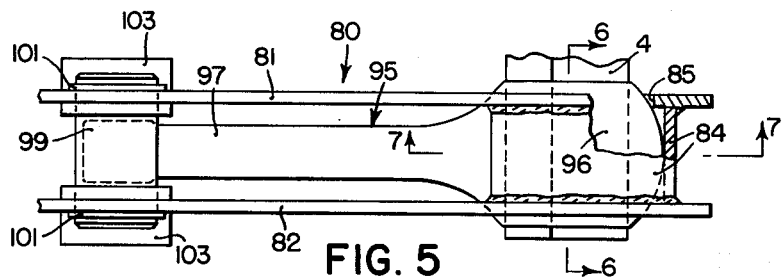
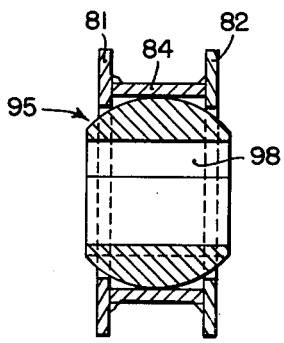
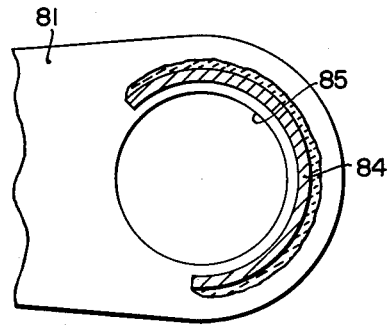
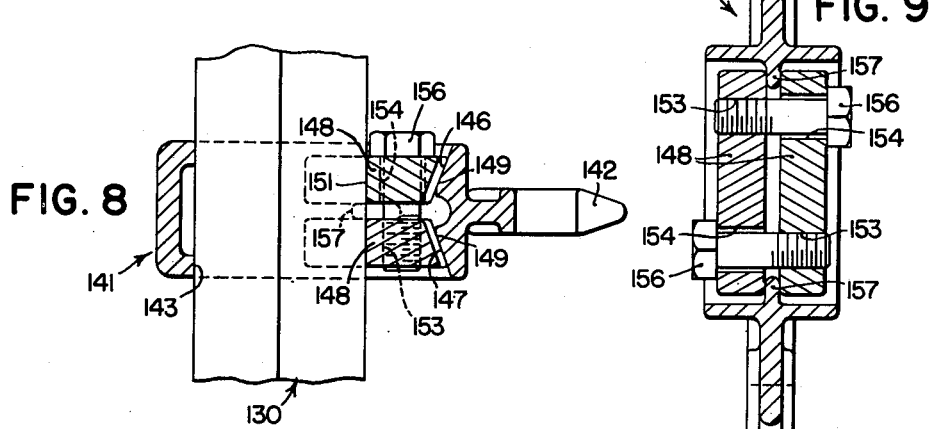
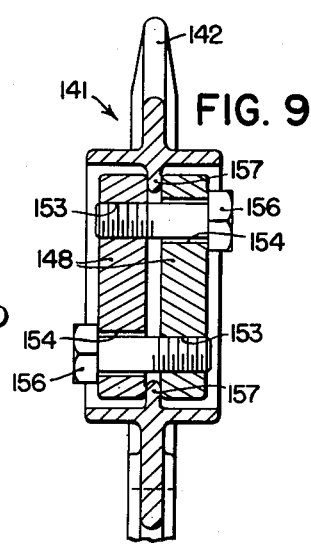
INVENTORS.
JESSE G. LINDEMAN, LAWRENCE F. HEINL,
ROBERT D. KREHBIEL, ORIE L. DURLAND
BY
ATTORNEYS Nov. 4, 1952  J. G. LINDEMAN ET AL  2,616,349
INTEGRAL TOOL CARRIER Filed Sept. 17, 1948  6 Sheets-Sheet 5

INVENTORS.
JESSE G. LINDEMAN, LAWRENCE F. HEINL
ROBERT D. KREHBIEL, ORIE L. DURLAND
BY
C. T. Parker and R. C. Johnson
ATTORNEYS

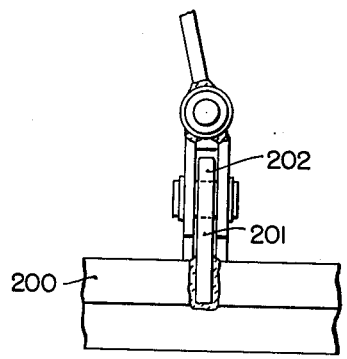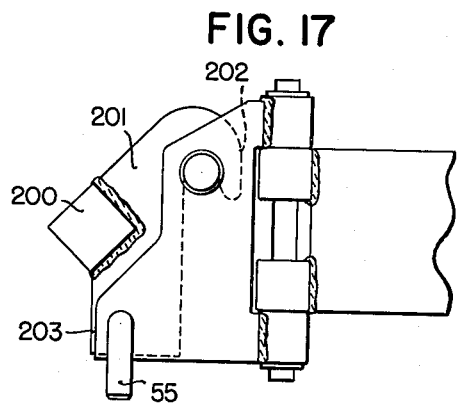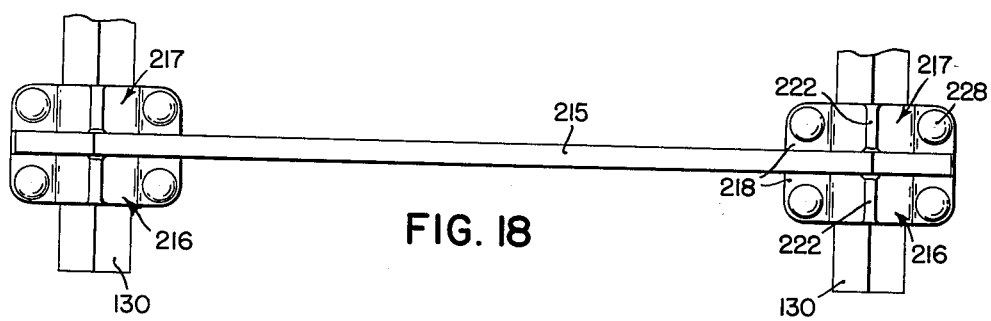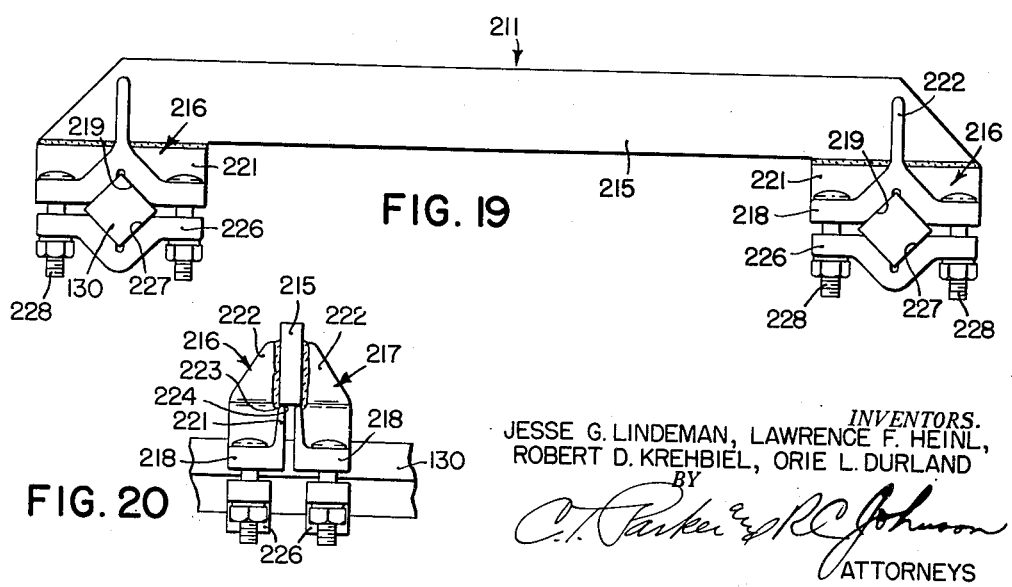

Patented Nov. 4, 1952

2,616,349

UNITED STATES PATENT OFFICE 2,616,349

INTEGRAL TOOL CARRIER

Jesse G. Lindeman, Yakima, Lawrence F. Heinl, Zillah, and Robert D. Krehbiel and Orie L. Durland, Yakima, Wash., assignors, by mesne assignments, to Deere & Company, Moline, Ill., a corporation of Illinois Application September 17, 1948, Serial No. 49,694

12 Claims. (Cl. 97—47)

1

The present invention relates generally to agricultural implements and more particularly to draft devices for mounting agricultural implements on or connecting them to farm tractors or the like.

The object and general nature of the present invention is the provision of a new and improved quick detachable tool carrier of the tool bar type adapted to be mounted on a farm tractor and to receive a plurality of ground working and other implements. A further feature of this invention is the provision of a tool carrier that is adapted to be controlled by the regular power lift of the tractor and a still further feature of this invention is the provision of a tool carrier which, when attached to the tractor, forms an integral part thereof and serves as means for carrying implements and the like in a compact and closely coupled arrangement, whereby the entire outfit is practically as maneuverable as the tractor alone.

A further feature of this invention is the provision of new and improved means, acting through the tool carrier, for adjusting the implement depth, the amount and degree of suction of earth working tools, and the lateral or transverse leveling of the implements. Further, it is a feature of this invention to provide a tool carrier of the type which may be adjusted to accommodate free lateral movement of the tool carried by the carrier or the parts may be arranged so that the implement may be locked in place laterally, as for transporting or when operating tools where a laterally rigid hitch is desired.

These and other objects and advantages of the present invention will be apparent to those skilled in the art after a consideration of the following detailed description of the preferred structure, taken in conjunction with the accompanying drawings.

In the drawings:

Figure 1 is a side view and Figure 2 is a rear view of the preferred form of tractor-carried or integral tool carrier, shown as mounted on a tractor of the type having a power lift including a rear transverse power lift rockshaft.

Figure 3 is a fragmentary sectional view taken along the line 3—3 of Figure 1, showing the ball and socket type of connection between the front and rear ends of the laterally spaced lower draft links and the tractor and tool carrier hitch frame.

Figure 4 is a fragmentary perspective view of the drawbar bracket or draft link support and

2 its connection to the tractor and the tractor drawbar support.

Figure 5 is a partial or fragmentary plan view of power lift arm or upper link connection between the tool carrier hitch frame and the tractor power lift rockshaft.

Figures 6 and 7 are sectional views taken, respectively, on the lines 6—6 and 7—7 of Figure 5, the ball joint arm being omitted in Figure 7.

Figures 8 and 9 are sectional views taken respectively along the lines 8—8 and 9—9 of Figure 1, showing the preferred form of tool bar mounting.

Figure 10:
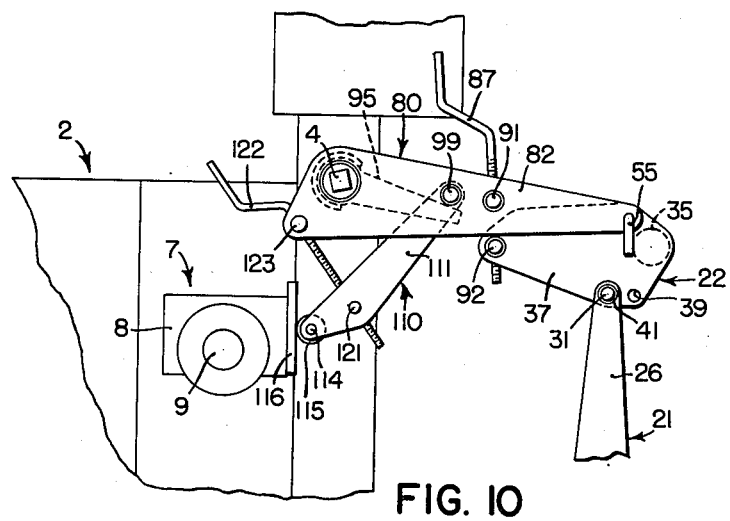

Figure 10 is a fragmentary side view showing the adjustable stop means limiting the lower position of the tool carrier.

Figure 11:
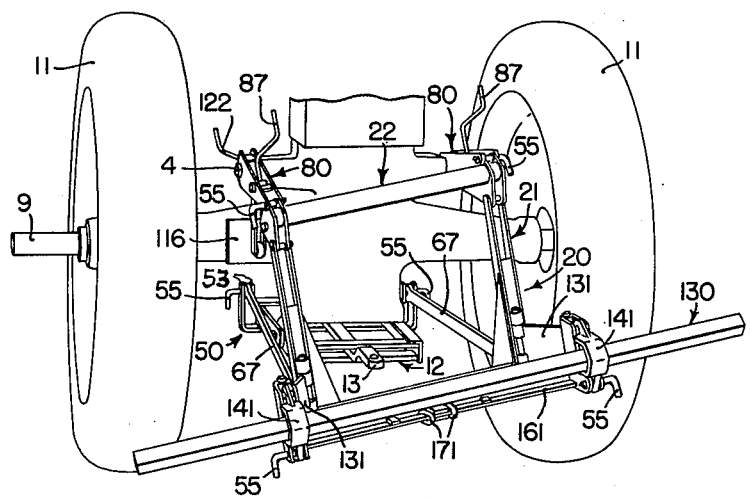

Figure 11 is a fragmentary perspective view showing the tool carrier adjusted for operating with the tool bar in a laterally tilted position, as may be desirable when using a plow attachment, with the right hand rear tractor wheel operating in a previously formed furrow.

Figure 12 is a fragmentary view showing the means for limiting the lateral movement of the tool bar relative to the hitch frame.

Figure 13 is a detail perspective of one of the stop members shown in Figure 12.

Figures 14 and 15 are side and end views, respectively, of one of the quick detachable pins employed for connecting the tool carrier with the tractor.

Figures 16 and 17 are plan and side views of a modified form of tool bar.

Figures 18, 19 and 20 are plan, side and rear views of another form of tool bar construction.

Referring first to Figures 1 and 2, the draft device of the present invention is shown as a tool carrier, indicated in its entirety by the reference numeral 1, mounted on a tractor 2 of the type having a controllable power lift unit 3 which is arranged to operate a transverse power lift rockshaft 4, the ends of which extend from opposite sides of a power lift rockshaft housing 5. The tractor and power lift is conventional, so far as the present invention is concerned, and may be similar to that shown in U. S. Patent 2,302,637, issued November 17, 1942, to E. McCormick, et al. The tractor 2 includes a rear axle housing 7 in lateral extensions 8 of which are axle shafts 9 on which rear traction wheels 11 are mounted. The lower portion of the rear axle housing 7, centrally of the tractor, carries a drawbar support 12 in which a laterally swingable drawbar 13 is disposed.

The draft device or tool carrier 1 includes a generally vertically disposed rigid hitch frame 20 which comprises a lower main frame unit 21 and an upper rigid leveling frame 22. As best shown in Figures 2 and 11, the lower frame unit 21 comprises a rigid frame section made up of a lower transverse tubular member 24 to each end of which a pair of vertical, closely spaced frame plates 25 and 26 are connected, as by welding or the like. Gusset plates 27 are welded to the inner plates 25 and the end portions of the transverse tubular member 24. Each pair of plates 25 and 26 is rigidly interconnected by one or more spacers 29, and the upper ends of the frame plates 25 and 26 are apertured to receive a pivot pin 31.

The leveling frame unit 22 comprises a rigid structure made up of a transverse tubular member 35 to each end of which is rigidly connected, as by welding, a pair of closely spaced plates 36 and 37, the spacing between the plates being such that they fit snugly between the upper portions of the main frame plates 25 and 26, as best shown in Figure 2. The lower rear portions of the plates 36 and 37 are provided with a pair of apertures 39 adapted to receive the associated pivot pin 31 and provided for two positions of the latter, as best shown in Figure 1. The pins 31 and associated parts provide a hinged connection between the main frame unit 21 and the leveling frame unit 22 whereby one part is constrained to move relative to the other about a transverse hinge axis, as defined by the pins 31. The latter may be of any suitable construction but preferably are relatively short cylindrical members having grooves at the end portions to receive snap rings 41 (Figure 10) which detachably hold the associated parts in assembled relation.

A draft link support in the form of a drawbar bracket 50 is adapted to be secured by a plurality of bolts 51 and 52 to the tractor drawbar support 12. The drawbar bracket 50 includes pairs of upstanding lugs 53, each provided with a pair of apertures 54 by which each pair of lugs is adapted to receive a quick detachable pin 55 in either of two optional positions. The construction of the pins 55 is best shown in Figures 14 and 15. Each pin includes a shaft portion 57 and a handle portion 58, the shaft portion being insertable through the openings in the lugs and/or other parts to receive it. The end of the shaft section 57 is slabbed off, as shown at 59, tapered at its outer end, as shown at 60, and is provided with an annular groove 61 which lies between a cylindrical portion 62 and the main body of the shaft section 57. The slabbed off portion 59 lies at the side adjacent the handle 58 and is thus arranged so that the pin may be inserted in openings arranged to fit the shaft section 57 with the exception that one of the inner openings, as the opening in the inner lug portion 53, is provided with an inwardly directed section 63 which is circularly complementary with respect to the slabbed off portion 59. Thus, when the pin 55 is turned to bring the handle section 58 upwardly and inserted in that position in the openings, the slabbed off portion 59 receives the inner section 63, and then when the handle section 58 is turned downwardly, the portion 63 interlocks in the groove 61 and prevents accidental disconnection of the pin 55. The bolt 52 serves also to pivotally interconnect the tractor drawbar 13 with the tractor drawbar support 12. Ordinarily, the drawbar bracket 50 is left as a more or less permanent part of the tractor, even when the integral tool carrier 1 of the present invention is disconnected from the tractor to provide for other uses of the latter.

The lower portion of the tool carrier hitch frame 20 is connected with the drawbar bracket 50 by link means which not only transmits the draft of the tools to the tractor but also provides for not only up and down movement of the hitch frame 20 but also lateral swinging and oscillation with respect to the tractor. Referring now more particularly to Figures 1-4, a pair of lower links 67 extends between the tractor and the lower portion of the hitch frame 20. Each link 67 includes an enlarged apertured end portion 68, the sides 69 of which are flanged and embrace a spherical bushing 71, the aperture 72 of which is dimensioned to fit snugly over the associated pivot pin. In order to hold the bushing 71 in place, the flanges 69 are crimped so as to snugly embrace the outer spherical surface of the associated bushing 71. The front end bushings 71 receive the shaft sections 57 of the associated quick detachable pins 55, and as best shown in Figure 3, the rear end of each of the links 67 is connected through the associated bushing 71 with a pivot pin 73 that extends through apertures 74 in the lower portions of the associated hitch frame plates 25 and 26. Each end of each pin 73 is grooved to receive a detachable snap ring 77, the rings 77 holding the pivot pins 73 in place but permitting their ready removal when desired. The hitch pin 73 and associated parts may be substantially identical with the connecting pin 31 mentioned above.

A pair of upper link members, each indicated in its entirety by the reference numeral 80, connects the leveling frame unit 22 of the hitch frame 20 with the tractor 2. Preferably this connection is made through the tractor power lift rockshaft 4 and the link members 80 are arranged to be so connected with the power lift rockshaft 4 as to serve as lift arms for raising the hitch frame 20 and associated tool-receiving bar and the tools connected therewith. Each link or power lift arm 80 comprises two plates 81 and 82 rigidly interconnected by a spacer 83 and an arcuate part 84 which partially encircles and is concentric with respect to openings 85 in the forward ends of the plates 81 and 82. The rear ends of each pair of plates 81 and 82 are pivotally connected with the associated pair of plates 36 and 37 of the leveling frame unit 22, by a quick detachable hitch pin that is identical with the hitch pin 55 described above. Thus, the last mentioned hitch pins establish a transverse axis about which the right and left hand links or arm members 80 are hingedly connected with the leveling frame unit 22 but relative movement between the parts in any other direction is restrained, not only by the hinged connection but also by the fact that the leveling frame plates 36 and 37 snugly fit within the lift arm plates 81 and 82, as best shown in Figure 2. While we have shown both connections as established through a quick detachable pin 55, only one need be quick detachable. The other may be a pin like that shown in Figure 3. Each arm 80 is adjustable relative to the adjacent portion of the leveling frame 22 by means of a crank screw 87 which is provided with oppositely threaded portions 88 and 89 received in swiveled trunnions 91 and 92 carried, respectively, by the plates 81, 82 and 36, 37, the members 91 and 92 having screw-threaded openings to receive the crank screw portions 88 and 89.

The forward end portions of the lifting arm plate members 81 and 82 are disposed on opposite sides of a ball joint arm 95 which, as best shown in Figures 5 and 6, includes a ball section 96 and an arm section 97 that extends in between the plate members 81 and 82 rearwardly of the rockshaft. The ball section 96 is provided with a square opening 98 to fit snugly but shiftably over the associated end of the power lift rockshaft 4, and the outer or rear end of each ball joint arm 95 is adapted to be disposed underneath an abutment pin 99 which is carried by the plate members 81 and 82 forward of the swiveled trunnion 91. The abutment pin 99 may, if desired, be substantially identical with the pivot pin 73 described below and, like that member, be provided with annular grooves at the end to receive retaining snap rings 101 or other fastening means. As will be seen from Figure 1, the outer ends of the ball joint arms 95 are disposed underneath the associated abutment pin 99, whereby the tool carrier 1 may move upwardly relative to the arms 95, which are held in position by the power lift shaft 4. However, when the latter shaft is rocked in a clockwise direction (Figure 1) the arms 80 and the entire tool carrier 1 are lifted into a raised or transport position. A pair of guide clips 103 are welded to the inner sides of the plates 81 and 82 and diverge downwardly and outwardly at their lower ends so as to guide the outer end of the associated ball joint arm 95 into position in contact with the abutment pin 99. Each of the lift arms 80, in any position of adjustment as determined by the crank screws 87, is connected as a rigid part of the leveling frame unit 22. However, the latter unit is pivotally connected with the rockshaft 4 through the ball joint sections 84, 85 and 96. The leveling frame unit 22 pivots relative to the upper portions of the hitch frame 21 by virtue of the pivot pins 31, as described above.

As best shown in Figures 2 and 10, the left hand lift arm 80 carries a pivoted stop bar, indicated in its entirety by the reference numeral 110. The stop bar 110 is made up of a pair of plates 111 and 112 apertured at their upper ends to receive and be mounted on the stop or abutment pin 99, by which the ball joint arm 95 on the left hand end of the power lift rockshaft 4 engages and raises the left hand arm 80. The lower end of the stop bar plates 111 and 112 are apertured to receive a pin 114 on which a stop roller 115 is mounted. The roller 115 is adapted to engage a stop plate 116 that is detachably fastened to the tractor rear axle housing extension 8 by studs 117. The plates 111 and 112 are extended intermediate their ends and apertured to receive a swiveled trunnion 121 in which the lower threaded end of a crank screw 122 is received. The upper portion of the crank screw 122 is rotatably supported on a swiveled trunnion 123 carried by the forward portion of the associated lift arm plates 81 and 82. Turning the crank screw 122 adjusts the position of the stop bar unit 110 relative to the associated lift arm 80 and thus serves to limit the downward movement of the leveling frame unit 22 and hence the entire tool bar carrier 1, relative to the tractor. At the left side of the tractor, the rear end of the ball joint arm 95 is received between the stop bar plates 111 and 112.

The transverse tool bar, on which any one of a plurality of ground-working or crop-working tools or implements may be mounted, is indicated in its entirety by the reference numeral 130. Preferably, the bar 130 extends laterally outwardly at opposite sides of the tractor and rearwardly of the rear tractor wheels 11. A pair of sway fittings 131, preferably in the form of links, are hingedly connected, as at 132, to the lower portions of the pairs of vertical plates 25, 26, and each sway fitting or link 131 is hingedly connected, as at 133, to a tool bar carrying bracket 135. Each bracket is made up of a pair of plates 136 and 137, the lower rear portions of which are extended in the form of lugs 138 which are apertured to receive a quick detachable pin 55. The upper rear portions of each pair of plates 136 and 137 carries a pin 139 which is rigidly secured to the plates 136 and 137 and serves as a spacer therefor. Detachably carried by each bracket 135 is a coupling member 141 having an upper forwardly disposed hook section 142 and an apertured portion 143 in which the tool bar 130 is disposed. The apertured portion 143 is considerably larger than the bar 130, and at the forward side of the opening 143 a pair of oppositely angled camming faces 146 and 147 are formed. Cooperating with these angled faces 146 and 147 is a pair of clamping members 148 having cooperating angled faces 149. Each cam member is provided with a pair of vertically spaced openings and a rearwardly facing V-shaped notch 151 to receive the forward side of the square bar 130. In each cam member 148 one of the openings, as indicated at 153 (Figure 8), is threaded, and the other opening, as indicated at 154 is cored. Thus, when the two cam members 148 are assembled in proper position, as shown in Figure 8, a cap screw 156 may be inserted through the cored opening 154 in one of the cam members 148 and threaded into the opening 153 in the other cam member. Then by tightening both cap screws 156, from opposite sides of the coupling member 141, the tool bar 130 is firmly and rigidly clamped in position. A center lug 157 is carried by upper and lower portions of the coupling member 141 for the purpose of centering the upper and lower portions of the two associated cam members 148.

As best shown in Figures 2 and 12, a transverse bar 161 is connected at its opposite ends to the inner plates of the tool bar receiving brackets 135 and receives a pair of fixed stops 162. A plurality of openings 163 are formed in the bar 161 between the stops 162, and welded at their forward ends to the central portion of the transverse tubular member 24 are upper and lower sway stops 166 and 167, the rear ends of which are disposed, respectively, above and below the transverse bar 161. If it should be desired to limit all lateral movement of the tool bar 130 relative to the tool carrier frame, a pair of link locks 171 are disposed in the laterally innermost pair of openings 163, which are spaced apart so that the link locks 171 are in substantial contact with the rear ends of the sway stop plates 166 and 167. If lateral movement of the tool bar is desired, the link locks 171 are moved through the outermost openings 163, adjacent the fixed stops 162. The link locks 171 are constructed as best shown in Figure 13. Essentially, the members 171 comprise a closed member 172 having a depending lug 173 which is adapted to be removably disposed in one or the other of the openings 163 at the side of the sway stop plates 166 and 167.

The mounting of the tool carrier as so far described on a tractor is substantially as follows:

After the draft link support or drawbar bracket 50 is mounted in place on the tractor, the forward ends of the links 67 are connected to the lugs 53 by the quick detachable pins 55, the rear ends of the draft links 67 normally being permanently connected by the pins 77 to the lower portion of the main frame unit 21. One of the lift arms 80 is then detached at its rear end from the leveling frame unit 22 and individually mounted on the associated end of the power lift rockshaft 4 by slipping the ball member 96 over one end of the tractor power lift rockshaft 4. Next, the power lift of the tractor is operated to rock the shaft 4 into its lower position, and then the hitch frame 20 is lifted into a position to permit the other lift arm 80, which ordinarily is permanently connected to the leveling frame 22, to be mounted on the other end of the tractor power lift rockshaft 4. Next, the first mentioned lift arm 80 is reconnected to the leveling frame 22 by the associated quick detachable pin 55. This holds the two lift arms 80 on the rockshaft 4, the crank screw 87 of the disconnected lift arm 80 being turned or threaded into the lower swiveled trunnion 92. Lastly, the transverse bar 130, together with its coupling members 141, is lifted into a position to engage the hooks 142 over the pins 139, and then the coupling members 141 are secured in position by inserting the lower rear pins 55 to lock the coupling members 141 to the sway brackets 135. The angular disposition of the sway links 131 with respect to one another may be varied, as desired, and thus change the effective hitch point where the brackets 135 and tool bar 130 are permitted to shift laterally relative to the tractor, by changing the positions of the coupling members 141 on the tool bar 130 to vary the lateral distance between the coupling members.

By turning the crank screws 87 in the same direction simultaneously, the rocking of the leveling frame unit 22 as a result thereof serves to raise and lower the tool-receiving bar 130, and by turning one crank screw 87 in one direction and the other crank screw 87 in the other direction, the tool bar 130 may be tilted laterally relative to the tractor. As best shown in Figure 11, one end of the bar 130 may be raised a considerable distance relative to the other so as to accommodate the attachment of a plow or similar implement to the tool bar 130 whereby the plow operates in a level position when one tractor wheel runs in an adjacent furrow. This laterally tilted position of the tool carrier is accommodated by virture of the ball and socket type of connection at the front and rear ends of the draft links 67 and at the forward ends of the lift links 80 with the rockshaft 4. However, the arms 80 remain substantially in the planes of the side members 25, 26 of the main hitch frame unit 21 so that the amount of tilt is always under the control of the two crank screws 87. However, even in the tilted position, the tool bar 130 and associated tools or implements are free to rise and fall, relative to the tractor, limited only by the contact of the ball joint arms 95 with the associated stop pins 99.

Figure 16 shows a modified form of tool bar construction in which a tool bar 200 is provided with coupling hook members 201 welded directly to the tool bar. While this lacks adjustment laterally it forms a cheaper arrangement than the tool bar mounting described above. Each of the coupling members 201 is provided with a hook section 202 and a lower apertured section 203 whereby the tool bar 200 may be used interchangeably with the tool bar 130.

Another modified form of tool bar structure is shown in Figures 18-20. This tool bar construction involves the use of several tool bars which are provided for clamping cultivator teeth or the like in a staggered position so as to reduce the clogging of the teeth when operating under trashy conditions. Referring now to these figures, we provide a pair of brackets 211. These brackets are preferably identical, and hence a description of one will suffice. Each bracket includes a fore and aft extending bar 215 mounted edgewise. Secured to each end of each bar is a pair of right and left hand tool bar clamps 216 and 217. Each clamp includes a base section 218 having a V-shaped notch 219, an upstanding flange portion 221 and a reenforcing lug 222 offset laterally away from the plane of the inner face of the flange section 221. The upper edge of the flange section 221 is beveled, as at 223 and 224, to facilitate welding the two clamps at each end of the bar to the bar end. The inner edge of the lug portion 222 is similarly beveled for the same purpose. A pair of the clamps 216 and 217 is fixed to each end of each of the tie bars 215. A cap 226, having a V-shaped notch 227, is secured, as by bolts 228, to the lower side of each of the tool bar clamps 216 and 217 and provides means for effectively clamping two tool bars 130 together. The forward tool bar 130 is clamped to the coupling members 141 by the means shown in Figures 1 and 8 and described in detail above. The tie bars may be disposed either inwardly or outwardly of the coupling members 141, as desired.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a draft device for connecting an implement to a tractor, a generally vertically disposed hitch frame adapted to be operatively connected with the tractor, a pair of laterally spaced rearwardly extending brackets connected with the lower portion of said hitch frame, each of said brackets having a pair of vertical laterally spaced apart side walls, a transverse pin carried at the upper portions of said side walls and extending across the space therebetween, each of said side walls being apertured at its lower portion, a transverse tool-receiving bar having a pair of laterally spaced coupling members carried thereby, each coupling member including an outwardly extended portion adapted to be disposed between the spaced apart side walls of the associated bracket from said pin downwardly to said lower apertures, each of said coupling members being formed at its upper end with an upper hook portion facing downwardly and adapted to engage over the pin of the associated bracket, and a lower apertured portion adapted to register with the apertures in the lower portions of said walls, and a coupling pin adapted to be inserted in each set of registering openings for coupling said transverse tool-receiving bar to said rearwardly extending brackets.

2. The invention set forth in claim 1, further characterized by said coupling members comprising plate-like parts welded to said tool bar.

3. The invention set forth in claim 1, further characterized by each of said coupling members comprising an opening receiving the associated tool bar, there being an angled surface at one side of said bar-receiving opening, a clamping member having a complementarily formed, angled camming surface adapted to fit against said angled surface, and means for moving said clamping member along said angled surface for clamping the tool bar in said coupling member.

4. The invention set forth in claim 3, further characterized by a pair of oppositely arranged angled surfaces on said coupling member, and a pair of clamping members having complementarily formed angled surfaces, and means acting between said clamping members for moving them along said angled surfaces and clamping said tool bar in said coupling member.

5. In an agricultural implement, a support, a pair of laterally spaced rearwardly extending brackets connected with said support, each of said brackets having an upper portion carrying a pin and a lower apertured portion disposed substantially underneath said pin, a transverse tool-receiving bar having a pair of laterally spaced coupling members carried thereby, each coupling member including an upper extension formed with a downwardly extending hook portion adapted to engage over the pin of the associated bracket with the pin lying between the forward edge of the coupling member and the downwardly extending hook portion, whereby said coupling members and tool-receiving bar may be supported temporarily on said bracket-carried pins, and a lower apertured portion adapted to register with the aperture in the associated bracket, and a coupling pin adapted to be inserted in each pair of registering openings for coupling said transverse tool-receiving bar to said rearwardly extending brackets.

6. In a draft device for connecting an implement to a support, a tool bar member, a coupling member having a portion receiving and embracing said tool bar member, said coupling member having at one side of said portion a pair of oppositely angled surfaces, a pair of clamping members having complementarily formed angled surfaces adapted to engage, respectively, said first mentioned angled surface, the opposite portions of said clamping members being shaped to engage said tool bar member, and means acting between said clamping members for moving them toward one another along said first angled surfaces and clamping said tool bar in said coupling member.

7. In an agricultural implement, a support, a pair of laterally spaced brackets connected with said support, each of said brackets having an upper portion carrying a pin and a lower apertured portion disposed substantially underneath said pin, a transverse tool-receiving bar having a pair of laterally spaced coupling members carried thereby, each coupling member including an upper extension formed with a downwardly extending hook portion adapted to engage over the pin of the associated bracket with the pin lying between the adjacent edge of the coupling member and the downwardly extending hook portion, whereby said coupling members and tool-receiving bar may be supported temporarily on said bracket-carried pins, and a lower apertured portion adapted to register with the aperture in the associated bracket, and a coupling pin adapted to be inserted in each pair of registering openings for coupling said transverse tool-receiving bar to said brackets.

8. For use with a draft device for connecting an implement to a support, which device includes a pair of brackets connected with said support, each of said brackets having an upper portion carrying a pin and a lower apertured portion disposed substantially underneath said pin: the improvement comprising a transverse tool-receiving bar having a pair of laterally spaced coupling members carried thereby, each coupling member including an upper extension formed with a downwardly extending hook portion adapted to engage over the pin of the associated bracket with the pin lying between the adjacent edge of the coupling member and the downwardly extending hook portion, whereby said coupling members and tool-receiving bar may be supported temporarily on said bracket-carried pins, and a lower apertured portion adapted to register with the aperture in the associated bracket, said lower apertured portion being spaced in a fore-and-aft direction from the associated hook portion a distance such that when the hook portion is engaged over the associated bracket pin, the aperture in said apertured portion registers with the associated bracket aperture.

9. In a draft device for connecting an implement to a tractor, a pair of laterally spaced apart, draft-transmitting brackets, each of said brackets having a pair of vertical laterally spaced apart side walls, a transverse pin carried at the upper portions of said side walls and extending across the space therebetween, each of said side walls being apertured at its lower portion, a tool support having a pair of laterally spaced coupling members carried thereby, the lateral spacing of said coupling members corresponding to the lateral spacing of said brackets, each coupling member including an outwardly extended portion adapted to be disposed between the spaced apart side walls of the associated bracket from said pin downwardly to said lower apertures, each of said coupling members being formed at its upper end with an upper hook portion facing downwardly and adapted to engage over the pin of the associated bracket, and a lower apertured portion adapted to register with the apertures in the lower portions of said walls, and a coupling pin adapted to be inserted in each set of registering openings for coupling said transverse tool-receiving bar to said rearwardly extending brackets.

10. A coupling member for supporting a tool bar or the like, said coupling member comprising a part having an opening to receive said tool bar, there being a pair of oppositely angled surfaces at one side of said bar-receiving opening, a pair of clamping members having complementarily formed, angled camming surfaces adapted to fit, respectively, against said angled surfaces, and means for moving said clamping members toward one another along said angled surfaces for clamping the tool bar in said part.

11. A coupling member for connecting a tool bar with a supporting bracket, said coupling member comprising a part having an opening to receive said tool bar, there being a pair of oppositely arranged angled surfaces on said part, and a pair of clamping members having complementarily formed angled surfaces, means acting between said clamping members for moving them along said angled surfaces and clamping said tool bar in the opening in said part, and means on said coupling member for connecting the latter to said bracket.

12. For use with an agricultural implement having a support and a pair of laterally spaced brackets connected with said support, each of said brackets having an upper portion carrying a pin and a lower apertured portion disposed substantially underneath said pin, the improvement comprising a tool-receiving member, a pair of laterally spaced coupling members carried thereby, each coupling member including an upper extension formed with a downwardly extending hook portion adapted to engage over the pin of the associated bracket with the pin lying between the adjacent edge of the coupling member and the downwardly extending hook portion, whereby said coupling members and tool-receiving bar may be supported temporarily on said bracket-carried pins, and a lower apertured portion adapted to register with the aperture in the associated bracket, and a coupling pin adapted to be inserted in each pair of registering openings for coupling said tool-receiving member to said brackets.

JESSE G. LINDEMAN.
LAWRENCE F. HEINL.
ROBERT D. KREHBIEL.
ORIE L. DURLAND.

REFERENCES CITED

The following references are of record in the file of this patent:

UNITED STATES PATENTS

| Number | Name | Date |
|---|---|---|
| 168,406 | Ober | Oct. 5, 1875 |
| 612,048 | Miller et al. | Oct. 11, 1898 |
| 659,741 | Graham | Oct. 16, 1900 |
| 1,006,974 | Moore et al. | Oct. 24, 1911 |
| 1,227,219 | Thysell | May 22, 1917 |
| 1,337,391 | Cooper | Apr. 20, 1920 |
| 2,129,746 | Smith | Sept. 13, 1938 |
| 2,174,808 | Tuft | Oct. 3, 1939 |
| 2,262,546 | Donoho et al. | Nov. 11, 1941 |
| 2,302,637 | McCormick et al. | Nov. 17, 1942 |
| 2,342,306 | Silver | Feb. 22, 1944 |
| 2,346,330 | Ratcliff | Apr. 11, 1944 |
| 2,402,008 | Ariens | June 11, 1946 |
| 2,430,732 | Orelind et al. | Nov. 11, 1947 |

FOREIGN PATENTS

| Number | Country | Date |
|---|---|---|
| 496,181 | France | July 24, 1919 |
| 616,484 | France | Oct. 29, 1926 |